United States Patent
Okamoto et al.

(10) Patent No.: US 11,571,993 B2
(45) Date of Patent: Feb. 7, 2023

(54) SEAT LIFTER

(71) Applicant: TOYOTA BOSHOKU KABUSHIKI KAISHA, Aichi-ken (JP)

(72) Inventors: Naoya Okamoto, Aichi-ken (JP); Sho Kume, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/196,653

(22) Filed: Mar. 9, 2021

(65) Prior Publication Data

US 2021/0284046 A1 Sep. 16, 2021

(30) Foreign Application Priority Data

Mar. 11, 2020 (JP) .............................. JP2020-042236

(51) Int. Cl.
*B60N 2/16* (2006.01)
*B60N 2/02* (2006.01)
*B60N 2/07* (2006.01)

(52) U.S. Cl.
CPC ......... *B60N 2/1655* (2013.01); *B60N 2/0224* (2013.01); *B60N 2/0722* (2013.01); *B60N 2/1615* (2013.01)

(58) Field of Classification Search
CPC .................................................. B60N 2/1655
See application file for complete search history.

(56) References Cited

U.S. PATENT DOCUMENTS

| 6,042,190 A * | 3/2000 | Mathe ..................... B60R 22/26 297/486 |
| 10,358,052 B1 * | 7/2019 | Mizukoshi ........... B60N 2/1615 |
| 2007/0107969 A1 * | 5/2007 | Ootani ................ B60R 22/4604 296/68.1 |
| 2008/0001458 A1 * | 1/2008 | Hoshihara .............. B60N 2/236 297/362 |
| 2012/0049598 A1 * | 3/2012 | Fujihara ............... B60N 2/1615 297/338 |
| 2020/0398706 A1 * | 12/2020 | Suzuki .................... F16D 11/16 |

FOREIGN PATENT DOCUMENTS

| DE | 3727860 A1 * | 3/1988 |
| EP | 3385165 A1 * | 10/2018 |
| JP | 2019-077336 A | 5/2019 |

* cited by examiner

*Primary Examiner* — David E Allred
(74) *Attorney, Agent, or Firm* — Greenblum & Bernstein, P.L.C.

(57) ABSTRACT

A seat lifter includes: an inner link for changing a height position of an inner lower arm with respect to a floor of a vehicle; an outer link for changing a height position of an outer lower arm with respect to the floor, a coupling rod that couples the inner link to the outer link; a planetary gear mechanism capable of causing the coupling rod to rotate relative to the inner lower arm and the outer lower arm; a drive unit capable of driving the planetary gear mechanism; and a power transmission rod that transmits power of the drive unit to the planetary gear mechanism. One of the planetary gear mechanism and the drive unit is disposed outside the outer lower arm in the width direction. The other of the planetary gear mechanism and the drive unit is disposed outside the inner lower arm in the width direction.

7 Claims, 9 Drawing Sheets

SEAT LIFTER

This nonprovisional application is based on Japanese Patent Application No. 2020-042236 filed on Mar. 11, 2020 with the Japan Patent Office, the entire contents of which are hereby incorporated by reference.

BACKGROUND

Field

The present disclosure relates to a seat lifter.

Description of the Background Art

A seat lifter using a planetary gear mechanism is conventionally known. Japanese Patent Laying-Open No. 2019-077336, for example, discloses a seat lifter including: a pair of right and left side frames; a pair of right and left sliders; a pair of right and left rear links; a pair of right and left front links; a pair of right and left planetary gear mechanisms each connected to each of the rear links; a coupling shaft that couples the planetary gear mechanisms to each other; and an operation force transmission unit that transmits operation force to the left planetary gear mechanism.

Each planetary gear mechanism includes: a sun gear that rotates by receiving the operation force from the operation force transmission unit; three planetary gears that revolve around the sun gear while rotating on their axes; and a fixed internal gear fixed to the side frame. The rear link has a different number of internal teeth than the fixed internal gear, and functions as a movable internal gear. Thus, driving of the operation force transmission unit effects rotation of the pair of right and left sun gears and the right and left planetary gears. This causes each rear link (movable internal gear) to rotate about a central axis of the sun gear with respect to the fixed internal gear, due to the difference in the number of internal teeth between the rear link and the fixed internal gear. As a result, the right and left side frames move up and down with respect to the sliders.

SUMMARY

In the seat lifter described in Japanese Patent Laying-Open No. 2019-077336, the planetary gear mechanism provided on the outer side in a width direction of a vehicle partially protrudes outward from the rear link, and the operation force transmission unit is disposed further outside the protrusion, resulting in a great amount of outward protrusion of the planetary gear mechanism and the operation force transmission unit from the side frame.

An object of the present disclosure is to provide a seat lifter capable of reducing an amount of outward protrusion of a planetary gear mechanism and a drive unit in a width direction of a vehicle.

A seat lifter according to an aspect of the present disclosure includes: an inner link for changing a height position of an inner lower arm with respect to a floor of a vehicle, the inner lower arm being disposed on an inner side in a width direction of the vehicle; an outer link for changing a height position of an outer lower arm with respect to the floor, the outer lower arm being disposed outside the inner lower arm in the width direction; a coupling rod that couples the inner link to the outer link so as to cause the inner link and the outer link to rotate together; a planetary gear mechanism connected to the coupling rod and capable of causing the coupling rod to rotate relative to the inner lower arm and the outer lower arm; a drive unit capable of driving the planetary gear mechanism; and a power transmission rod that transmits power of the drive unit to the planetary gear mechanism, one of the planetary gear mechanism and the drive unit being disposed outside the outer lower arm in the width direction, and the other of the planetary gear mechanism and the drive unit being disposed outside the inner lower arm in the width direction.

DESCRIPTION OF THE PREFERRED EMBODIMENTS

An embodiment of the present disclosure will be described with reference to the drawings. In the drawings referred to below, the same or corresponding components are designated by the same numbers.

Figure 1:
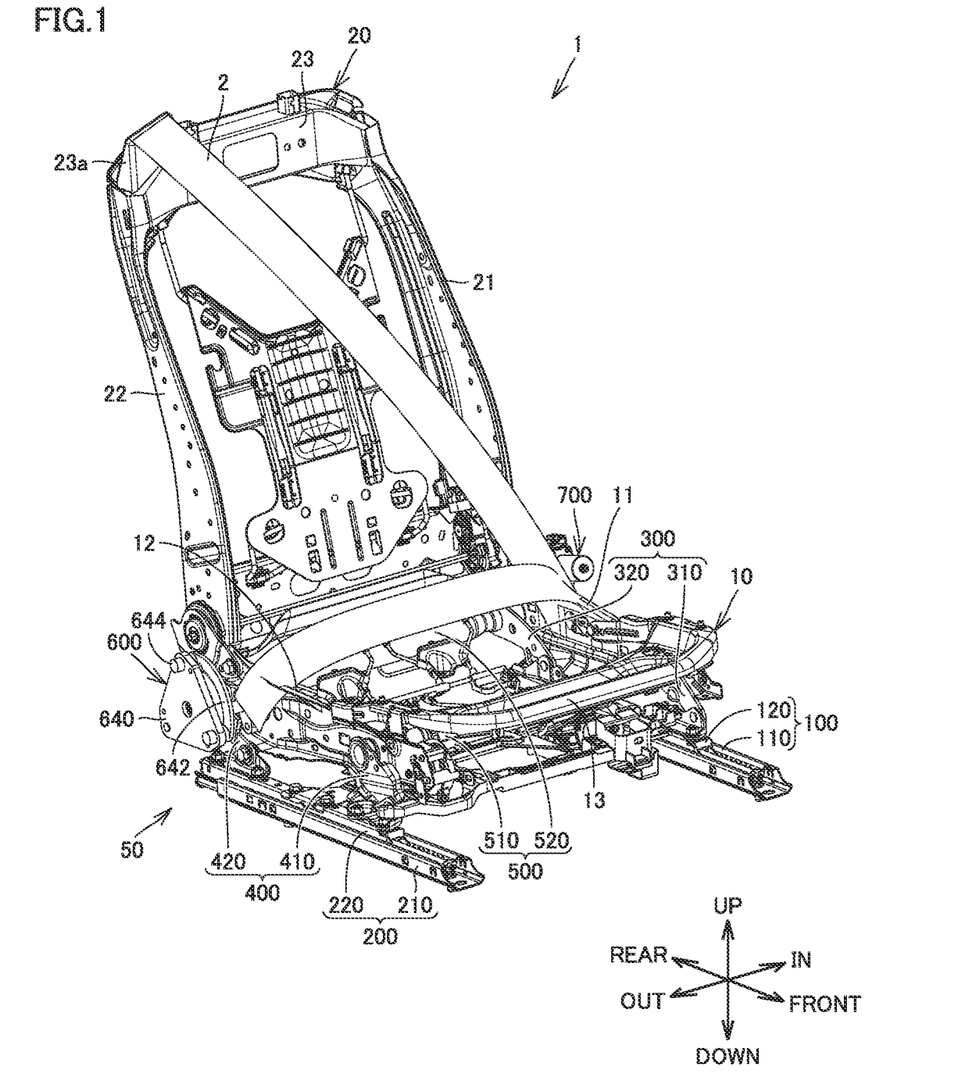
FIG. 1 is a perspective view schematically showing a seat frame in one embodiment of the present disclosure.

FIG. 1 is a perspective view schematically showing a seat frame in one embodiment of the present disclosure. As shown in FIG. 1, a seat frame 1 in the present embodiment includes a cushion frame 10, a back frame 20, and a seat lifter 50. This seat frame 1 functions as a frame of a vehicle seat, particularly of an automobile seat.

Cushion frame 10 is formed as a framework of a seat cushion. Cushion frame 10 includes an inner lower arm 11, an outer lower arm 12, and a front panel 13.

Inner lower arm 11 is disposed on an inner side in a width direction of the vehicle. Inner lower arm 11 is shaped to extend in a fore/aft direction of the vehicle.

Outer lower arm 12 is disposed outside inner lower arm 11 in the width direction. Outer lower arm 12 is shaped to extend in the fore/aft direction of the vehicle.

Front panel 13 couples a front end portion of inner lower arm 11 to a front end portion of outer lower arm 12.

Back frame 20 is formed as a framework of a seat back. Back frame 20 is tiltable with respect to cushion frame 10. Back frame 20 includes an inner side frame 21, an outer side frame 22, and an upper frame 23.

Inner side frame 21 is connected to a rear end portion of inner lower arm 11. Inner side frame 21 is shaped to extend upward from the rear end portion of inner lower arm 11. Inner side frame 21 is tiltable about its lower end portion with respect to inner lower arm 11.

Outer side frame 22 is connected to a rear end portion of outer lower arm 12. Outer side frame 22 is shaped to extend upward from the rear end portion of outer lower arm 12. Outer side frame 22 is tiltable about its lower end portion with respect to outer lower arm 12.

Upper frame 23 couples upper end portions of inner side frame 21 and outer side frame 22 to each other. An outer end portion of upper frame 23, that is, an upper portion of outer side frame 22, is provided with a belt insertion portion 23a through which a seat belt 2 is inserted.

Seat lifter 50 is connected to cushion frame 10. Seat lifter 50 is a mechanism that changes a height position of cushion frame 10 with respect to a floor of the vehicle.

Figure 2:
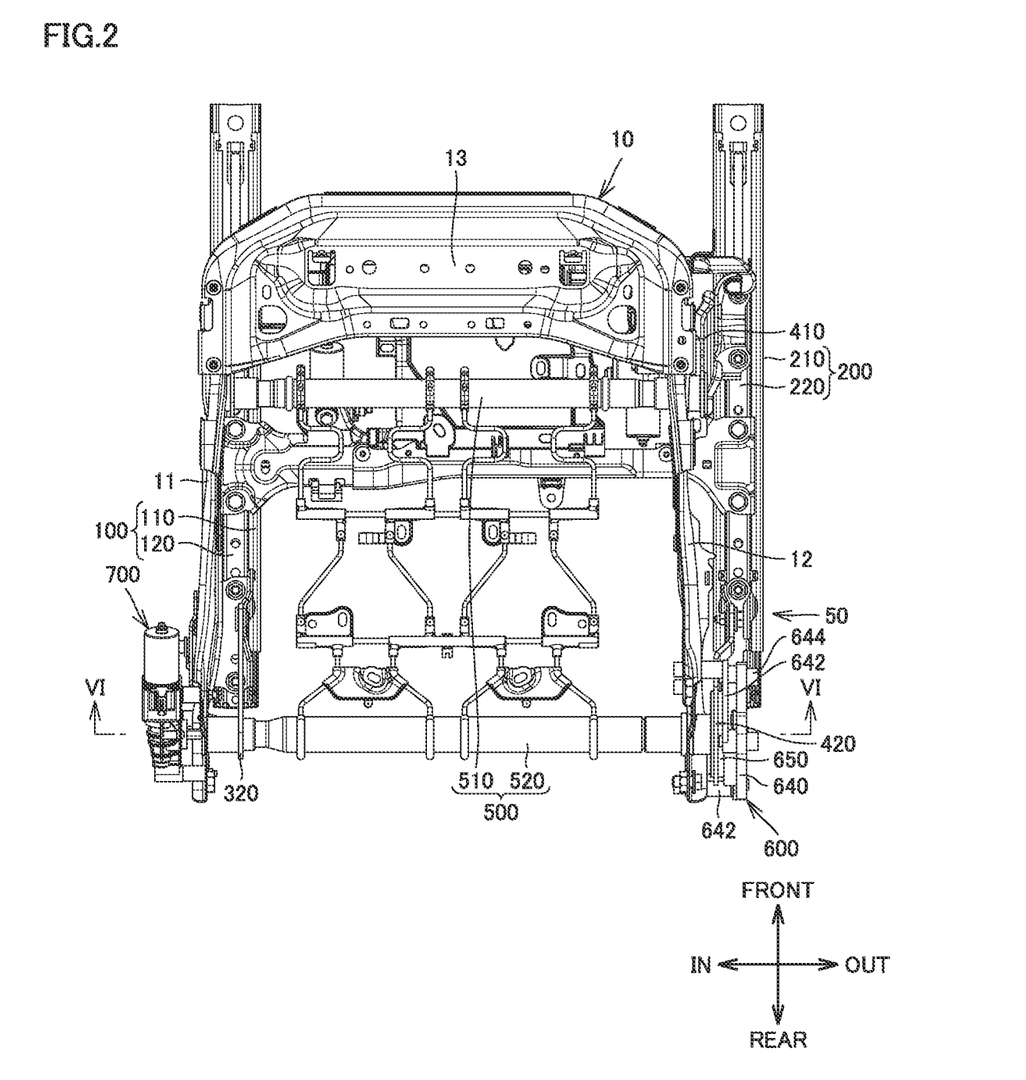
FIG. 2 is a plan view of a cushion frame and a seat lifter.
Figure 3:
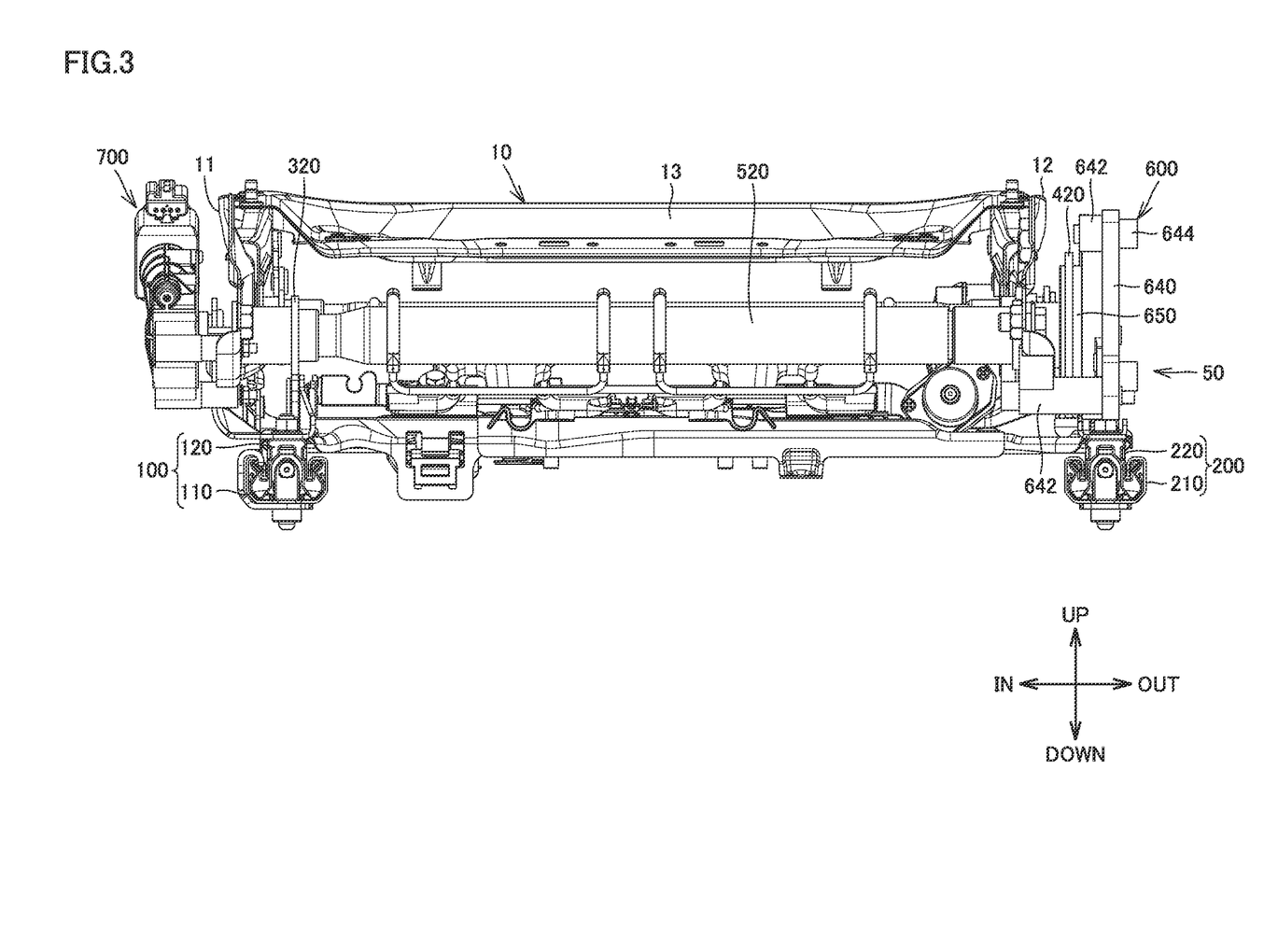
FIG. 3 is a rear view of the cushion frame and the seat lifter.
Figure 4:
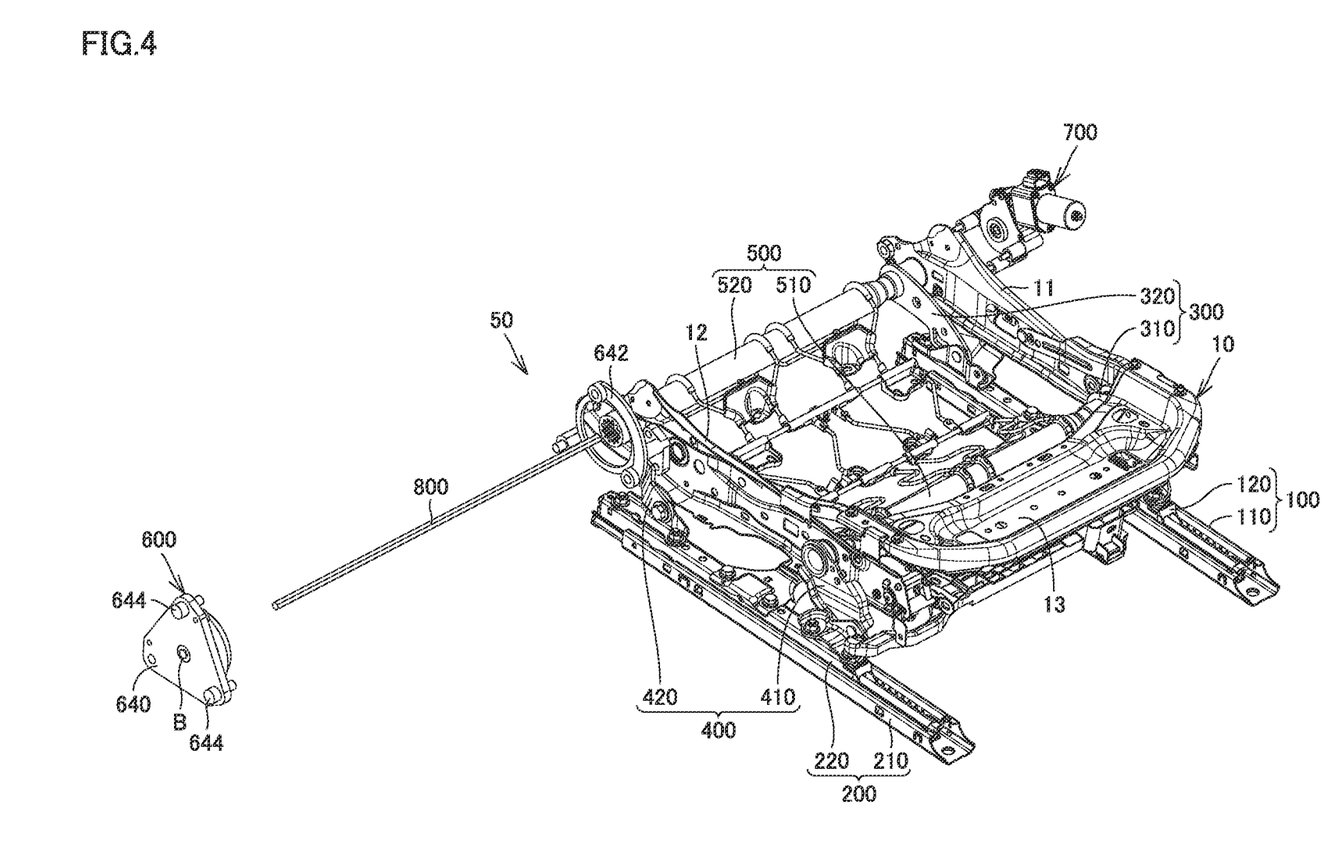
FIG. 4 is an exploded perspective view of a drive unit, a planetary gear mechanism and a power transmission rod.

FIG. 2 is a plan view of the cushion frame and the seat lifter. FIG. 3 is a rear view of the cushion frame and the seat lifter. FIG. 4 is an exploded perspective view of a drive unit, a planetary gear mechanism and a power transmission rod.

As shown in FIGS. 1 to 4, seat lifter 50 in the present embodiment includes an inner slide rail 100, an outer slide rail 200, an inner link 300, an outer link 400, a coupling rod 500, a planetary gear mechanism 600, a drive unit 700, and a power transmission rod 800.

Inner slide rail 100 is a mechanism that causes inner lower arm 11 to slide with respect to the floor. Inner slide rail 100 is disposed below inner lower arm 11. Inner slide rail 100 includes an inner lower rail 110 and an inner upper rail 120.

Inner lower rail 110 is fixed to the floor. Inner lower rail 110 is shaped to extend in the fore/aft direction.

Inner upper rail 120 is slidable in the fore/aft direction with respect to inner lower rail 110.

Outer slide rail 200 is a mechanism that causes outer lower arm 12 to slide with respect to the floor. Outer slide rail 200 is disposed below outer lower arm 12. Outer slide rail 200 has a similar structure to inner slide rail 100. That is, outer slide rail 200 includes an outer lower rail 210 fixed to the floor, and an outer upper rail 220 slidable in the fore/aft direction with respect to outer lower rail 210.

Inner link 300 is a member for changing a height position of inner lower arm 11 with respect to the floor (inner slide rail 100). In the present embodiment, inner link 300 includes an inner front link 310 and an inner rear link 320.

A lower end portion of inner front link 310 is coupled to a front portion of inner upper rail 120. Specifically, inner front link 310 is connected to inner upper rail 120 so as to be pivotable about the lower end portion of inner front link 310 with respect to inner upper rail 120. An upper end portion of inner front link 310 is connected to a front coupling rod 510 which will be described later.

A lower end portion of inner rear link 320 is coupled to a rear portion of inner upper rail 120. Specifically, inner rear link 320 is connected to inner upper rail 120 so as to be pivotable about the lower end portion of inner rear link 320 with respect to inner upper rail 120. An upper end portion of inner rear link 320 is connected to a rear coupling rod 520 which will be described later.

Outer link 400 is a member for changing a height position of outer lower arm 12 with respect to the floor (outer slide rail 200). In the present embodiment, outer link 400 includes an outer front link 410 and an outer rear link 420.

A lower end portion of outer front link 410 is coupled to a front portion of outer upper rail 220. Specifically, outer front link 410 is connected to outer upper rail 220 so as to be pivotable about the lower end portion of outer front link 410 with respect to outer upper rail 220. An upper end portion of outer front link 410 is connected to front coupling rod 510.

A lower end portion of outer rear link 420 is coupled to a rear portion of outer upper rail 220. Specifically, outer rear link 420 is connected to outer upper rail 220 so as to be pivotable about the lower end portion of outer rear link 420 with respect to outer upper rail 220. An upper end portion of outer rear link 420 is connected to a movable internal gear 650 which will be described later.

Coupling rod 500 is a rod that couples inner link 300 to outer link 400 so as to cause inner link 300 and outer link 400 to rotate together. In the present embodiment, coupling rod 500 includes front coupling rod 510 and rear coupling rod 520.

Front coupling rod 510 couples the upper end portion of inner front link 310 to the upper end portion of outer front link 410. An inner end portion of front coupling rod 510 in the width direction is connected to a front portion of inner lower arm 11. An outer end portion of front coupling rod 510 in the width direction is connected to a front portion of outer lower arm 12. Front coupling rod 510 is formed in a cylindrical shape.

Rear coupling rod 520 couples the upper end portion of inner rear link 320 to the upper end portion of outer rear link 420. An inner end portion of rear coupling rod 520 in the width direction is connected to a rear portion of inner lower arm 11. An outer end portion of rear coupling rod 520 in the width direction is connected to a rear portion of outer lower arm 12. Rear coupling rod 520 rotates together with inner rear link 320 and outer rear link 420. Rear coupling rod 520 is formed in a cylindrical shape.

Planetary gear mechanism 600 is connected to rear coupling rod 520. Planetary gear mechanism 600 is capable of causing rear coupling rod 520 to rotate about its central axis relative to inner lower arm 11 and outer lower arm 12. In the present embodiment, planetary gear mechanism 600 is connected to the outer end portion of rear coupling rod 520. Planetary gear mechanism 600 is disposed outside outer lower arm 12. Planetary gear mechanism 600 has the function of reinforcing the lower end portion of outer side frame 22. In the present embodiment, when a tensile load acts on belt insertion portion 23a via seat belt 2, a relatively high load acts on the lower end portion of outer side frame 22. Therefore, planetary gear mechanism 600 is connected to the outer end portion of rear coupling rod 520. As shown in FIG. 3, an outer end portion of planetary gear mechanism 600 in the width direction is located inside an outer end portion of outer slide rail 200 in the width direction.

Figure 5:
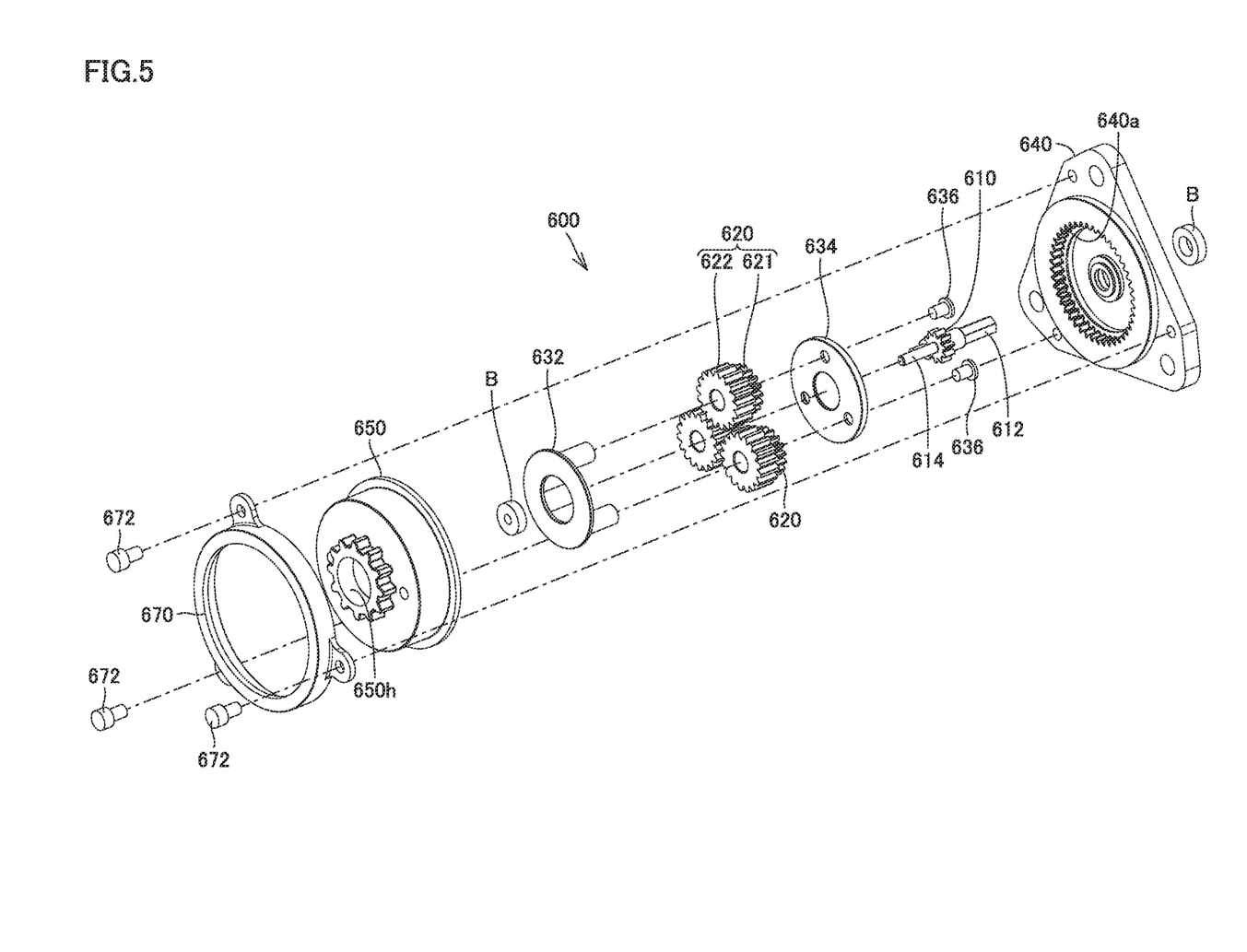
FIG. 5 is an exploded perspective view of the planetary gear mechanism.

As shown in FIG. 5, planetary gear mechanism 600 includes a sun gear 610, at least one planetary gear 620 (three planetary gears 620 in the present embodiment), a carrier 632, a carrier cover 634, carrier fixing bolts 636, a fixed internal gear 640, movable internal gear 650, a ring 670, and ring fixing bolts 672.

Figure 7:
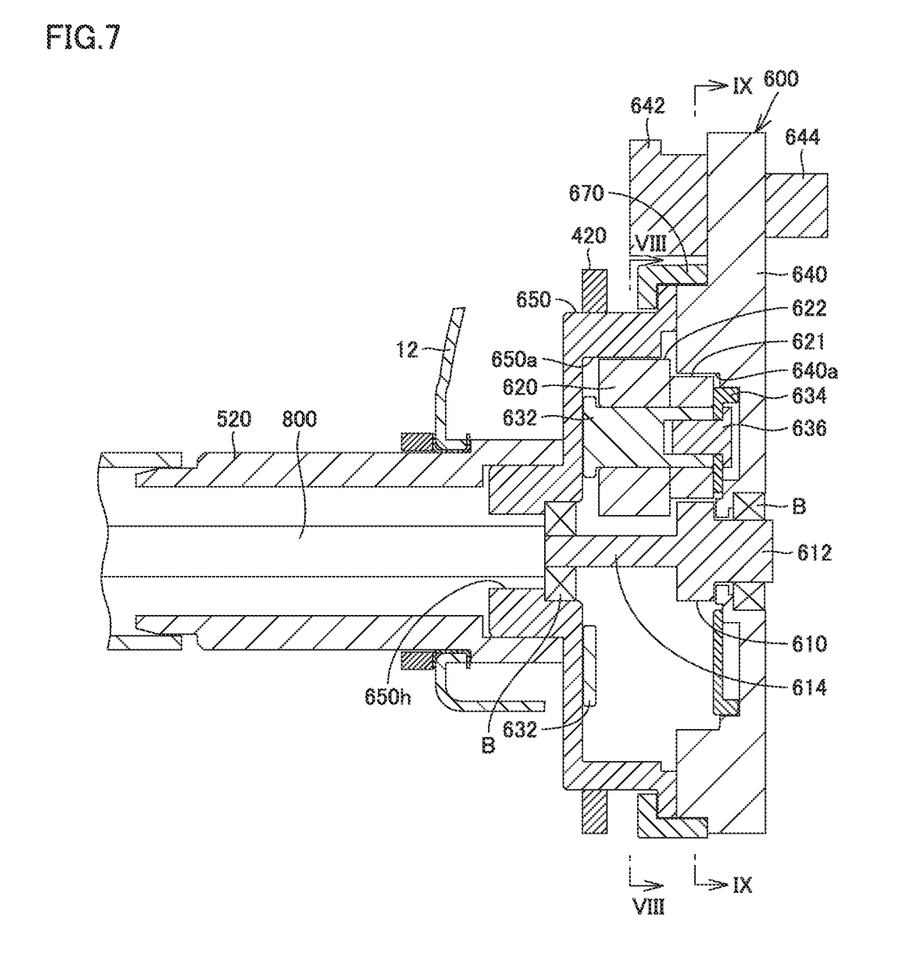
FIG. 7 is an enlarged view of an area indicated by a solid line VII in FIG. 6.

Sun gear 610 rotates about the central axis of rear coupling rod 520. A fixed shaft portion 612 and a movable shaft portion 614 are connected to sun gear 610. As shown in FIG. 7, fixed shaft portion 612 is held to fixed internal gear 640 via a bearing B. Movable shaft portion 614 is held to movable internal gear 650 via bearing B.

Figure 8:
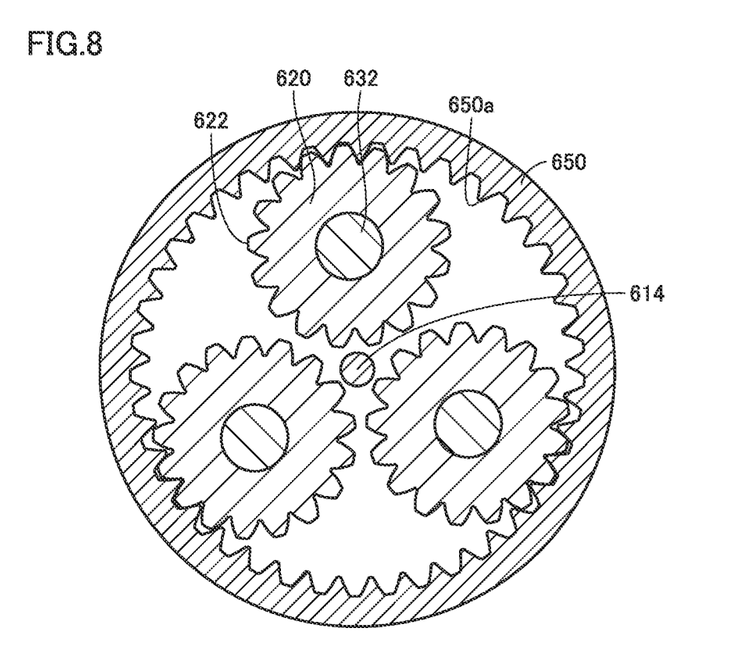
FIG. 8 is a cross-sectional view along a line VIII-VIII shown in FIG. 7.
Figure 9:
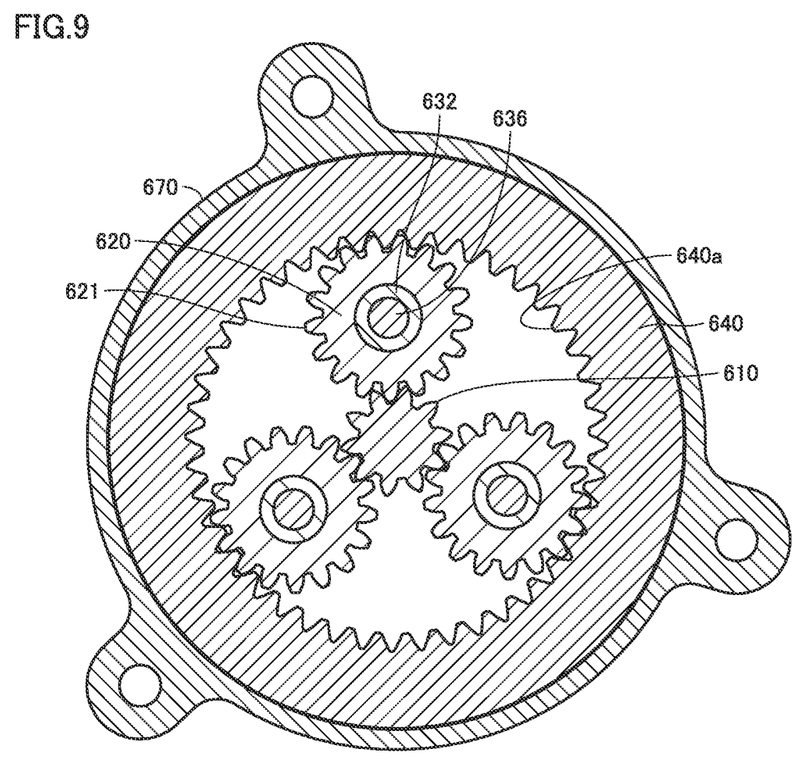
FIG. 9 is a cross-sectional view along a line IX-IX shown in FIG. 7.

Each planetary gear 620 circles around sun gear 610 while meshing with sun gear 610. In other words, planetary gear 620 revolves (circles) around sun gear 610 about a rotational central axis of sun gear 610, while rotating about a rotational central axis of planetary gear 620. Each planetary gear 620 is disposed about the rotational central axis of sun gear 610. As shown in FIG. 8, each planetary gear 620 is disposed about movable shaft portion 614. In the present embodiment, three planetary gears 620 are disposed at regular intervals along the direction of rotation of sun gear 610. Each planetary gear 620 includes a fixed gear portion 621 and a movable gear portion 622.

Fixed gear portion 621 is formed at an outer end portion of planetary gear 620 in the width direction (a direction of the rotational central axis of planetary gear 620).

Movable gear portion 622 is formed at an inner end portion of planetary gear 620 in the width direction. Movable gear portion 622 has the same number of teeth as fixed gear portion 621. The length of movable gear portion 622 in a direction of the rotational axis is preferably set to be greater than the length of fixed gear portion 621 in the same direction.

Each planetary gear 620 is held to carrier 632. Carrier cover 634 holds each planetary gear 620 between itself and carrier 632. Carrier cover 634 is fixed to carrier 632 with carrier fixing bolts 636.

Fixed internal gear 640 is fixed to outer lower arm 12. As shown in FIGS. 1 to 4, fixed internal gear 640 is fixed to outer lower arm 12 by a coupling member 642 and bolts 644 so as not to be rotatable relative to outer lower arm 12. Fixed internal gear 640 has internal teeth 640a that mesh with fixed gear portion 621 of each planetary gear 620.

Movable internal gear 650 has internal teeth 650a that mesh with movable gear portion 622 of each planetary gear 620. Movable internal gear 650 has a different number of teeth than fixed internal gear 640. Movable internal gear 650 is rotatable about the rotational central axis of sun gear 610 relative to fixed internal gear 640. Movable internal gear 650 is connected to the outer end portion of rear coupling rod 520 so as to rotate together with rear coupling rod 520. Movable internal gear 650 is provided with an insertion hole 650h through which power transmission rod 800 is inserted. Outer rear link 420 is fixed to movable internal gear 650 so that movable internal gear 650 and outer rear link 420 rotate together.

Ring 670 is a member for attaching movable internal gear 650 to fixed internal gear 640. Ring 670 is fixed to fixed internal gear 640 with ring fixing bolts 672 while holding movable internal gear 650 between itself and fixed internal gear 640.

Drive unit 700 is capable of driving planetary gear mechanism 600. In the present embodiment, a motor is used as drive unit 700. However, drive unit 700 may be configured to manually drive planetary gear mechanism 600. As shown in FIGS. 2 and 3, drive unit 700 is disposed outside inner lower arm 11 in the width direction.

Figure 6:
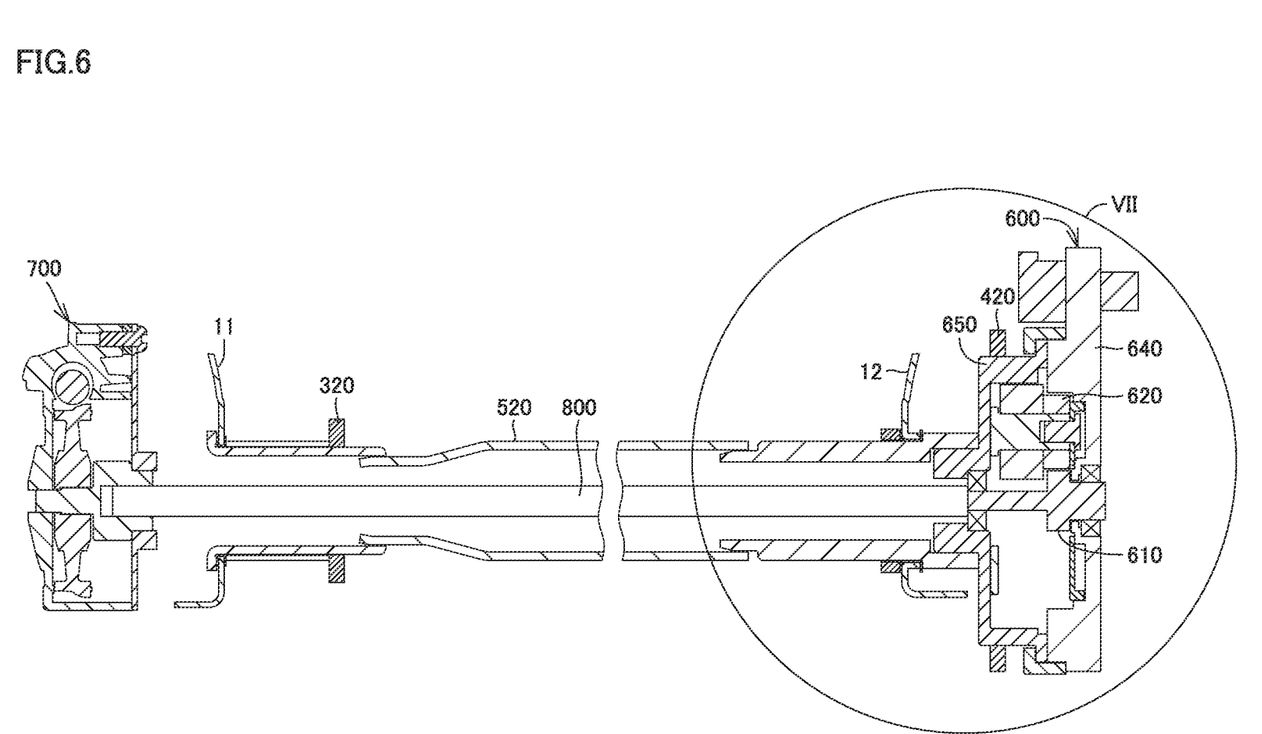
FIG. 6 is a cross-sectional view along a line VI-VI in FIG. 2.

Power transmission rod 800 is a member that transmits output from drive unit 700 to planetary gear mechanism 600. As shown in FIG. 6, power transmission rod 800 is disposed in rear coupling rod 520. Power transmission rod 800 couples an output shaft of drive unit 700 to movable shaft portion 614. Thus, driving of drive unit 700 effects rotation of sun gear 610.

An operation of seat lifter 50 will now be described.

First, when drive unit 700 is driven, sun gear 610 rotates together with power transmission rod 800. As a result, each planetary gear 620 rotates around sun gear 610.

Then, due to the difference in the number of teeth between fixed internal gear 640 and movable internal gear 650, movable internal gear 650 rotates about the rotational central axis of sun gear 610 relative to fixed internal gear 640. Along with this movable internal gear 650, outer rear link 420, rear coupling rod 520 and inner rear link 320 rotate together. Specifically, inner rear link 320 rotates about its lower end portion relative to inner upper rail 120, and outer rear link 420 rotates about its lower end portion relative to outer upper rail 220. At this time, inner front link 310 rotates about its lower end portion relative to inner upper rail 120, and outer front link 410 rotates about its lower end portion relative to outer upper rail 220. As a result, cushion frame 10 and back frame 20 move up and down with respect to the floor.

In seat lifter 50 described above, as one of planetary gear mechanism 600 and drive unit 700 is disposed outside outer lower arm 12 in the width direction, and the other is disposed outside inner lower arm 11 in the width direction, an amount of outward protrusion of planetary gear mechanism 600 and drive unit 700 in the width direction is reduced.

In addition, as planetary gear mechanism 600 is disposed outside outer lower arm 12 in the width direction, a connection portion between outer lower arm 12 and outer side frame 22 is reinforced by planetary gear mechanism 600. Thus, the connection portion has increased strength.

In addition, as outer rear link 420, rear coupling rod 520 and inner rear link 320 rotate together along with movable internal gear 650, the upward and downward movement of cushion frame 10 can be achieved by single planetary gear mechanism 600.

In addition, as the length of movable gear portion 622 in the direction of the rotational axis is set to be greater than the length of fixed gear portion 621 in the same direction, movable internal gear 650 can have increased strength.

It should be understood that the embodiment disclosed herein is illustrative and non-restrictive in every respect. The scope of the present disclosure is defined by the terms of the claims, rather than the description of the embodiment above, and further includes any modifications within the scope and meaning equivalent to the terms of the claims.

For example, the locations of planetary gear mechanism 600 and drive unit 700 may be reversed. In other words, drive unit 700 may be connected to the outer end portion of rear coupling rod 520, and planetary gear mechanism 600 may be connected to the inner end portion of rear coupling rod 520.

Outer rear link 420 may be connected to the outer end portion of rear coupling rod 520.

It is understood by a person skilled in the art that the embodiment described above is provided as specific examples of the following aspects.

A seat lifter according to an aspect of the present disclosure includes: an inner link for changing a height position of an inner lower arm with respect to a floor of a vehicle, the inner lower arm being disposed on an inner side in a width direction of the vehicle; an outer link for changing a height position of an outer lower arm with respect to the floor, the outer lower arm being disposed outside the inner lower arm in the width direction; a coupling rod that couples the inner link to the outer link so as to cause the inner link and the outer link to rotate together; a planetary gear mechanism connected to the coupling rod and capable of causing the coupling rod to rotate relative to the inner lower arm and the outer lower arm; a drive unit capable of driving the planetary gear mechanism; and a power transmission rod that transmits power of the drive unit to the planetary gear mechanism, one of the planetary gear mechanism and the drive unit being disposed outside the outer lower arm in the width direction, and the other of the planetary gear mechanism and the drive unit being disposed outside the inner lower arm in the width direction.

In this seat lifter, as one of the planetary gear mechanism and the drive unit is disposed outside the outer lower arm in the width direction, and the other is disposed outside the inner lower arm in the width direction, an amount of outward protrusion of the planetary gear mechanism and the drive unit in the width direction is reduced.

Preferably, the planetary gear mechanism includes a sun gear connected to a tip end of the power transmission rod, a planetary gear that rotates around the sun gear while meshing with the sun gear, a fixed internal gear having internal teeth that mesh with the planetary gear, and fixed to one of the inner lower arm and the outer lower arm so as not to be rotatable relative to the lower arm, the one of the inner lower arm and the outer lower arm being disposed closer to the sun gear, and a movable internal gear having internal teeth that mesh with the planetary gear, and rotatable about a rotational central axis of the sun gear relative to the fixed internal gear, the coupling rod is connected to the movable internal gear so as to rotate together with the movable internal gear, the movable internal gear is provided with an insertion hole through which the power transmission rod is inserted, and the power transmission rod is disposed in the coupling rod.

Preferably, the planetary gear includes a fixed gear portion that meshes with the fixed internal gear, and a movable gear portion that meshes with the movable internal gear, the movable gear portion has a same number of teeth as the fixed gear portion, and the movable internal gear has a different number of teeth than the fixed internal gear.

The outer lower arm may be connectable to a lower end portion of an outer side frame of a pair of side frames included in a back frame, the outer side frame being located closer to a belt insertion portion through which a seat belt is inserted. In this case, preferably, the planetary gear mechanism is disposed outside the outer lower arm in the width direction, and the drive unit is disposed outside the inner lower arm in the width direction.

Accordingly, as a connection portion between the outer lower arm and the outer side frame is reinforced by the planetary gear mechanism, the connection portion has increased strength.

Preferably, the inner link is fixed to the coupling rod, and the outer link is fixed to the movable internal gear.

The seat lifter may further include an inner slide rail that causes the inner lower arm to slide with respect to the floor, and an outer slide rail that causes the outer lower arm to slide with respect to the floor. Preferably, the inner slide rail includes an inner lower rail fixed to the floor, and an inner upper rail slidable with respect to the inner lower rail, the outer slide rail includes an outer lower rail fixed to the floor, and an outer upper rail slidable with respect to the outer lower rail, the inner link is coupled to the inner upper rail so as to be rotatable with respect to the inner upper rail, and the outer link is coupled to the outer upper rail so as to be rotatable with respect to the outer upper rail.

Preferably, an outer end portion of the planetary gear mechanism in the width direction is located inside an outer end portion of the outer slide rail in the width direction.

According to the present disclosure, a seat lifter capable of reducing an amount of outward protrusion of a planetary gear mechanism and a drive unit in a width direction of a vehicle can be provided.

What is claimed is:

1. A seat lifter comprising:
    an inner link for changing a height position of an inner lower arm with respect to a floor of a vehicle, the inner lower arm being disposed on an inner side in a width direction of the vehicle;
    an outer link for changing a height position of an outer lower arm with respect to the floor, the outer lower arm being disposed outside the inner lower arm in the width direction;
    a coupling rod that couples the inner link to the outer link so as to cause the inner link and the outer link to rotate together;
    a single planetary gear mechanism connected to the coupling rod and capable of causing the coupling rod to rotate relative to the inner lower arm and the outer lower arm, wherein the single planetary gear mechanism is operable to simultaneously control movement of both the inner link and the outer link via the coupling rod;
    a drive unit capable of driving the planetary gear mechanism; and
    a power transmission rod that transmits power of the drive unit to the planetary gear mechanism,
    one of the planetary gear mechanism and the drive unit being disposed outside the outer lower arm in the width direction, and
    the other of the planetary gear mechanism and the drive unit being disposed outside the inner lower arm in the width direction,
    wherein the power transmission rod can rotate relative to the coupling rod.

2. The seat lifter according to claim 1, wherein
the planetary gear mechanism includes
    a sun gear connected to a tip end of the power transmission rod,
    a planetary gear that rotates around the sun gear while meshing with the sun gear,
    a fixed internal gear having internal teeth that mesh with the planetary gear, and fixed to one of the inner lower arm and the outer lower arm so as not to be rotatable relative to the one of the inner lower arm and the outer lower arm, the one of the inner lower arm and the outer lower arm being disposed closer to the sun gear, and
    a movable internal gear having internal teeth that mesh with the planetary gear, and rotatable about a rotational central axis of the sun gear relative to the fixed internal gear,
the coupling rod is connected to the movable internal gear so as to rotate together with the movable internal gear,
the movable internal gear is provided with an insertion hole through which the power transmission rod is inserted, and
the power transmission rod is disposed in the coupling rod.

3. The seat lifter according to claim 2, wherein
the planetary gear includes
    a fixed gear portion that meshes with the fixed internal gear, and
    a movable gear portion that meshes with the movable internal gear,
the movable gear portion has a same number of teeth as the fixed gear portion, and
the movable internal gear has a different number of teeth than the fixed internal gear.

4. The seat lifter according to claim 2, wherein
the outer lower arm is connectable to a lower end portion of an outer side frame of a pair of side frames included in a back frame, the outer side frame being located closer to a belt insertion portion than the other of the pair of side frames, wherein the belt insertion portion is through which a seat belt is inserted,
the planetary gear mechanism is disposed outside the outer lower arm in the width direction, and
the drive unit is disposed outside the inner lower arm in the width direction.

5. The seat lifter according to claim 4, wherein
the inner link is fixed to the coupling rod, and
the outer link is fixed to the movable internal gear.

6. The seat lifter according to claim 4, further comprising:
an inner slide rail that causes the inner lower arm to slide with respect to the floor; and
an outer slide rail that causes the outer lower arm to slide with respect to the floor, wherein
the inner slide rail includes
    an inner lower rail fixed to the floor, and
    an inner upper rail slidable with respect to the inner lower rail,
the outer slide rail includes
    an outer lower rail fixed to the floor, and
    an outer upper rail slidable with respect to the outer lower rail,
the inner link is coupled to the inner upper rail so as to be rotatable with respect to the inner upper rail, and
the outer link is coupled to the outer upper rail so as to be rotatable with respect to the outer upper rail.

7. The seat lifter according to claim 6, wherein
an outer end portion of the planetary gear mechanism in the width direction is located inside an outer end portion of the outer slide rail in the width direction.

* * * * *